Figure 16:
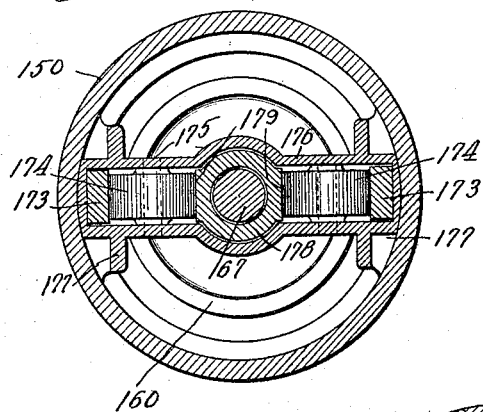
Figure 17:
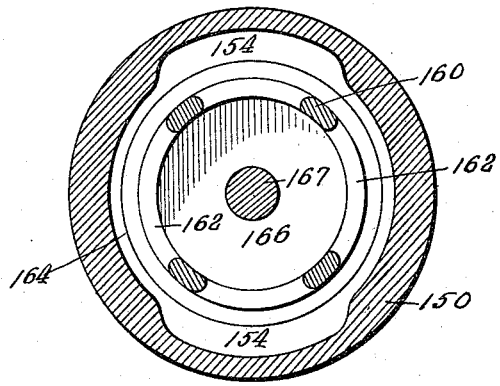
Figure 18:
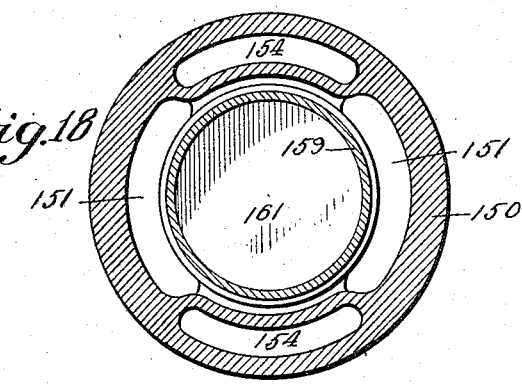
Figure 19:
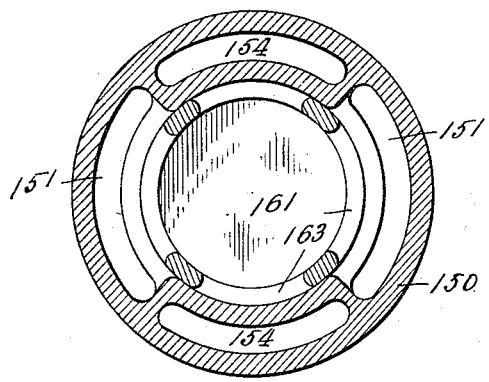
Figure 20:
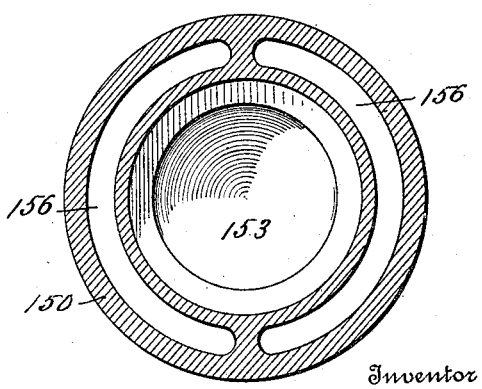
Figure 24:
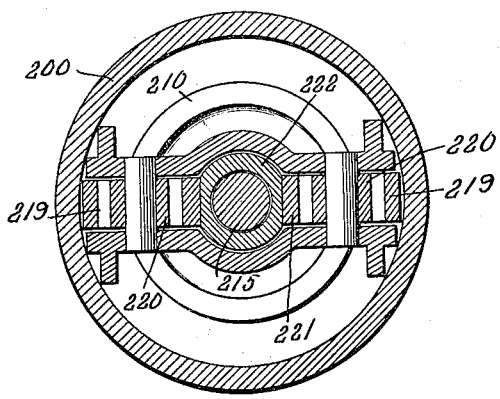
Figure 25:
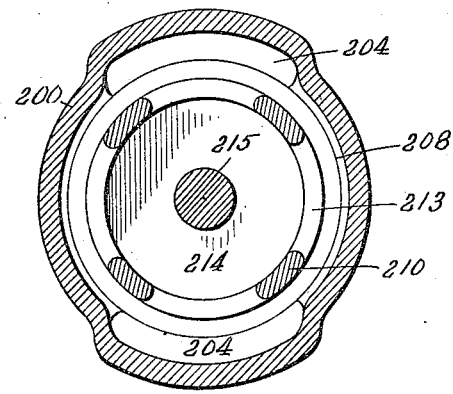
Figure 26:
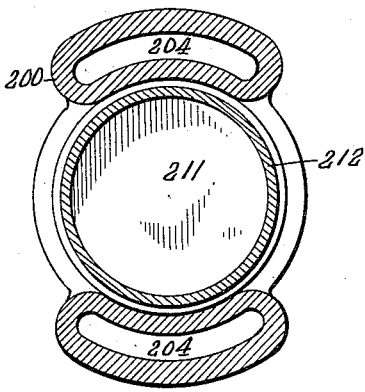
Figure 27:
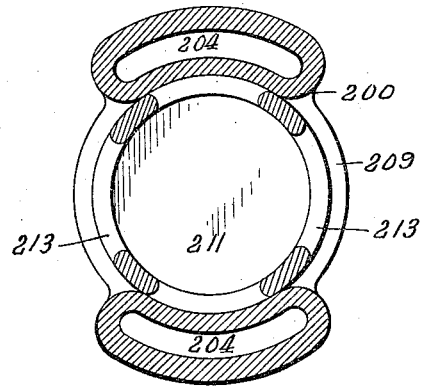

J. M. MICHAELSON.
PUMP.
APPLICATION FILED JULY 11, 1912.
1,175,970.
Patented Mar. 21, 1916.
9 SHEETS—SHEET 1.
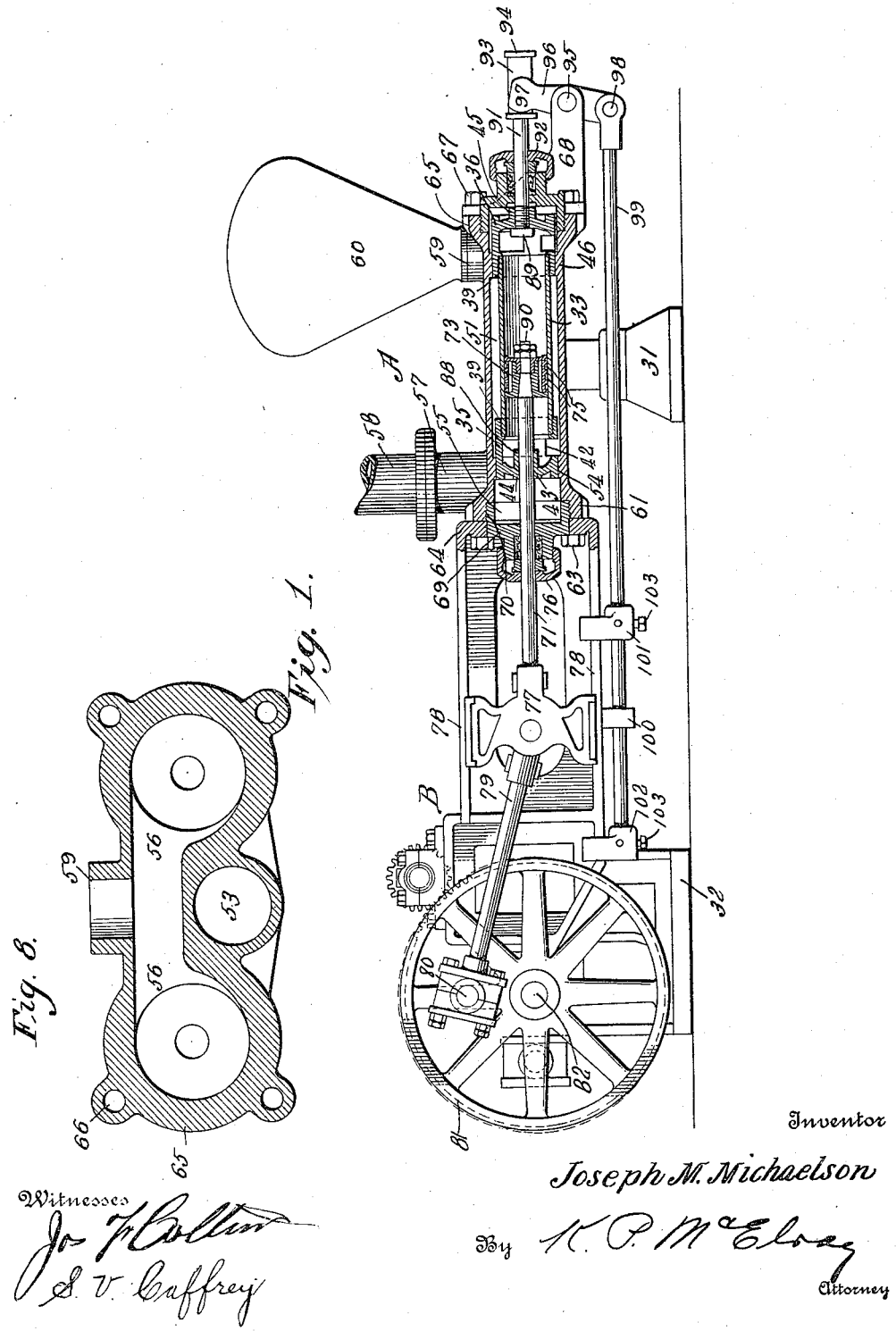

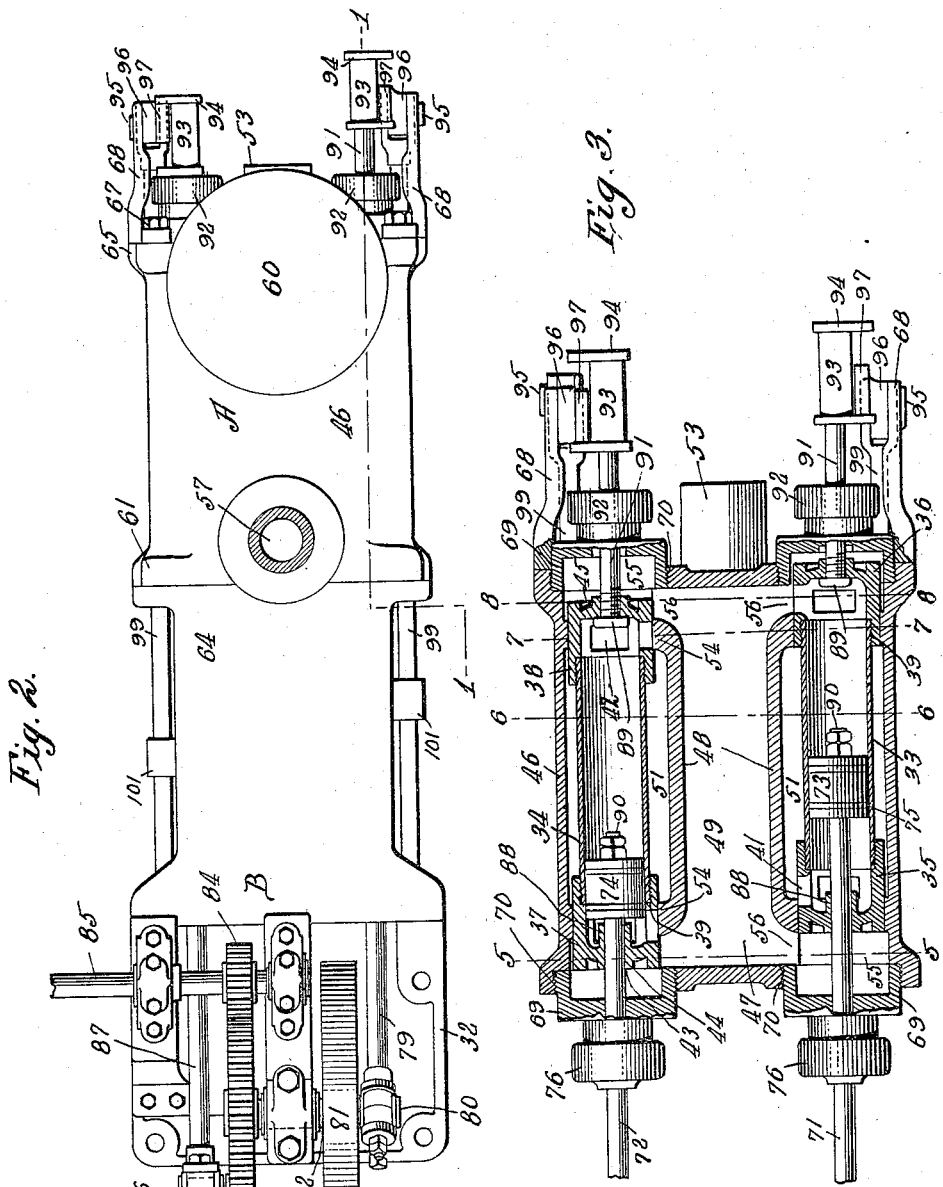

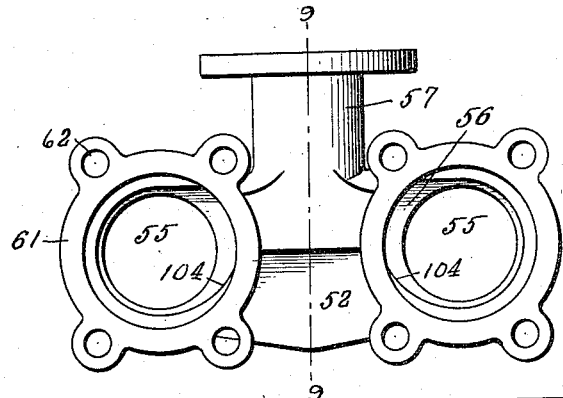
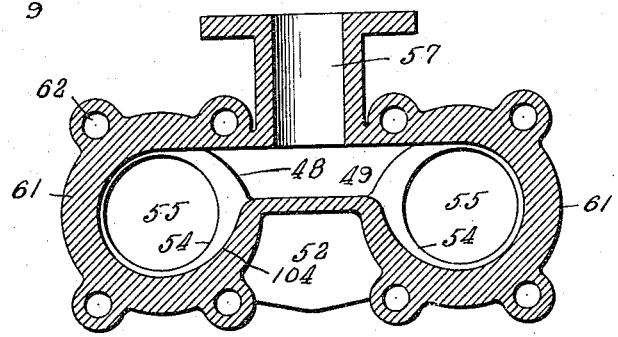
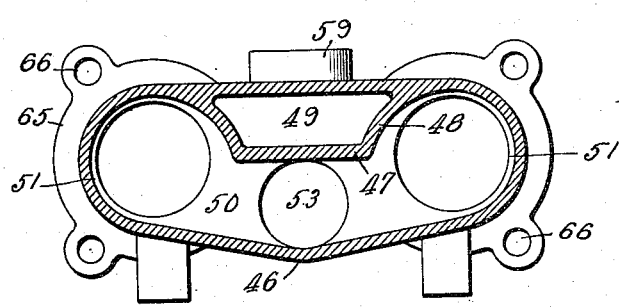
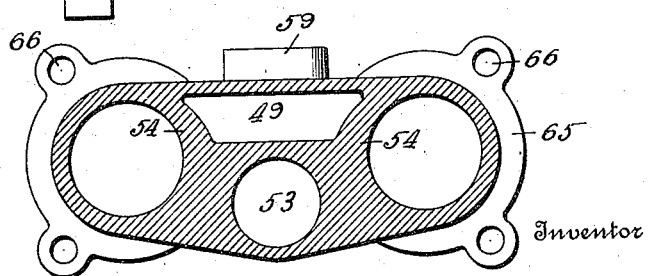

J. M. MICHAELSON.
PUMP.
APPLICATION FILED JULY 11, 1912.
1,175,970.
Patented Mar. 21, 1916.
9 SHEETS—SHEET 4.
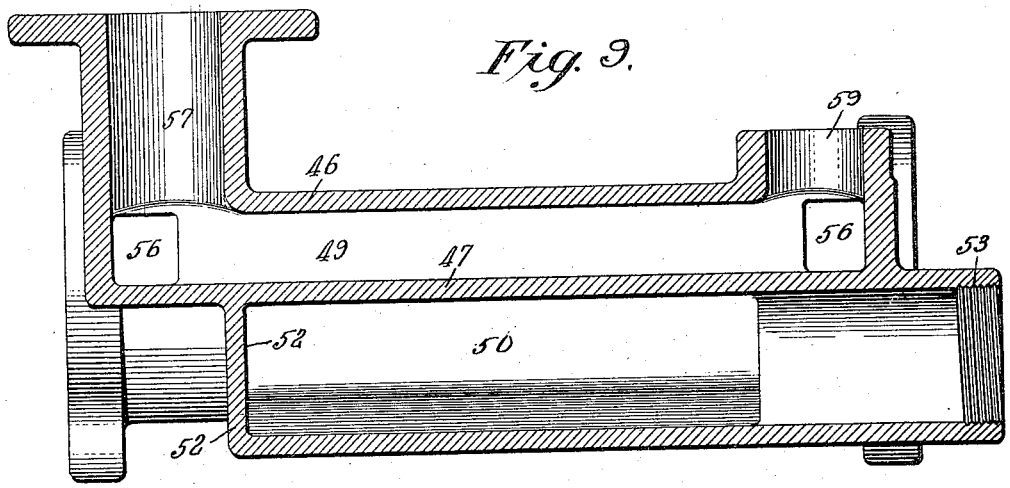
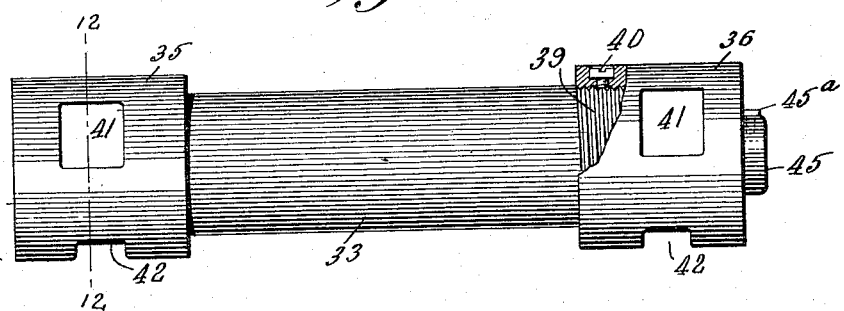
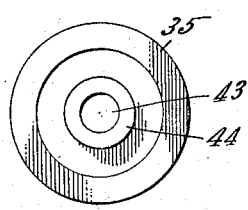
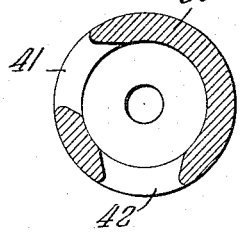
Inventor
Joseph M. Michaelson

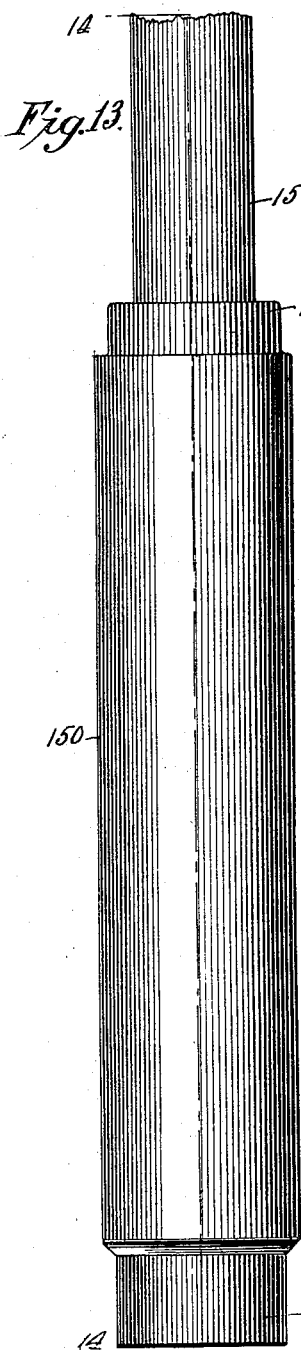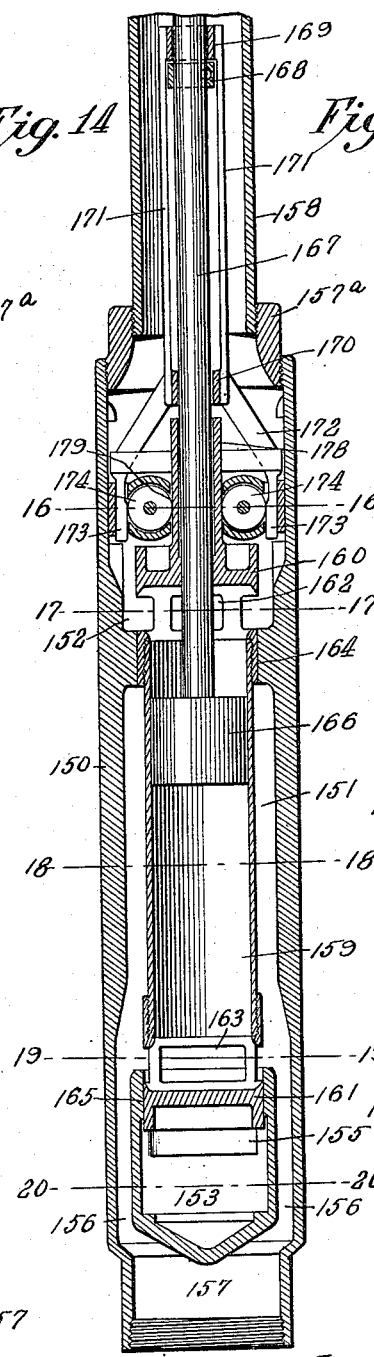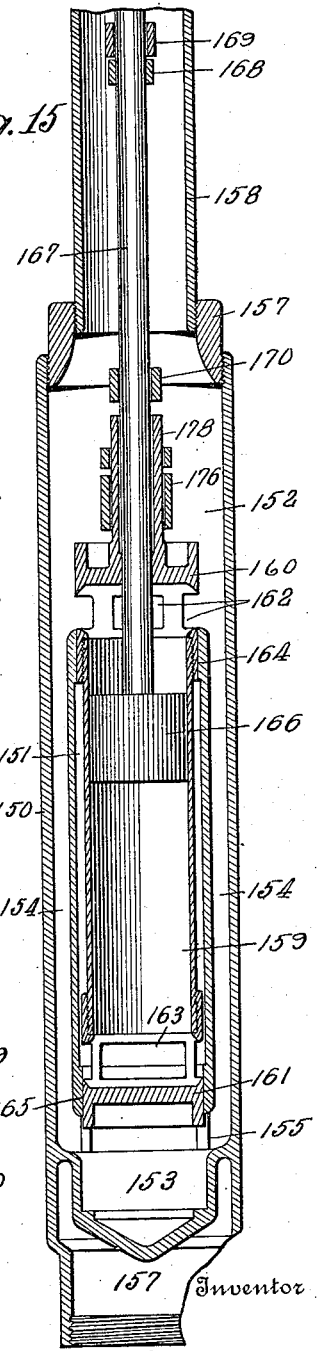

J. M. MICHAELSON.
PUMP.
APPLICATION FILED JULY 11, 1912.

1,175,970.

Patented Mar. 21, 1916.
9 SHEETS—SHEET 6.

Witnesses
Jos. J. Collins.
S. V. Caffrey

Inventor
Joseph M. Michaelson
By K. P. McElroy
Attorney

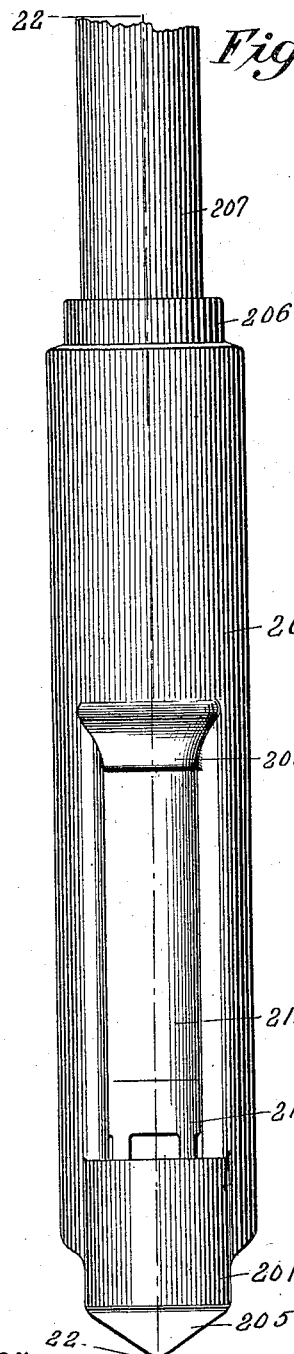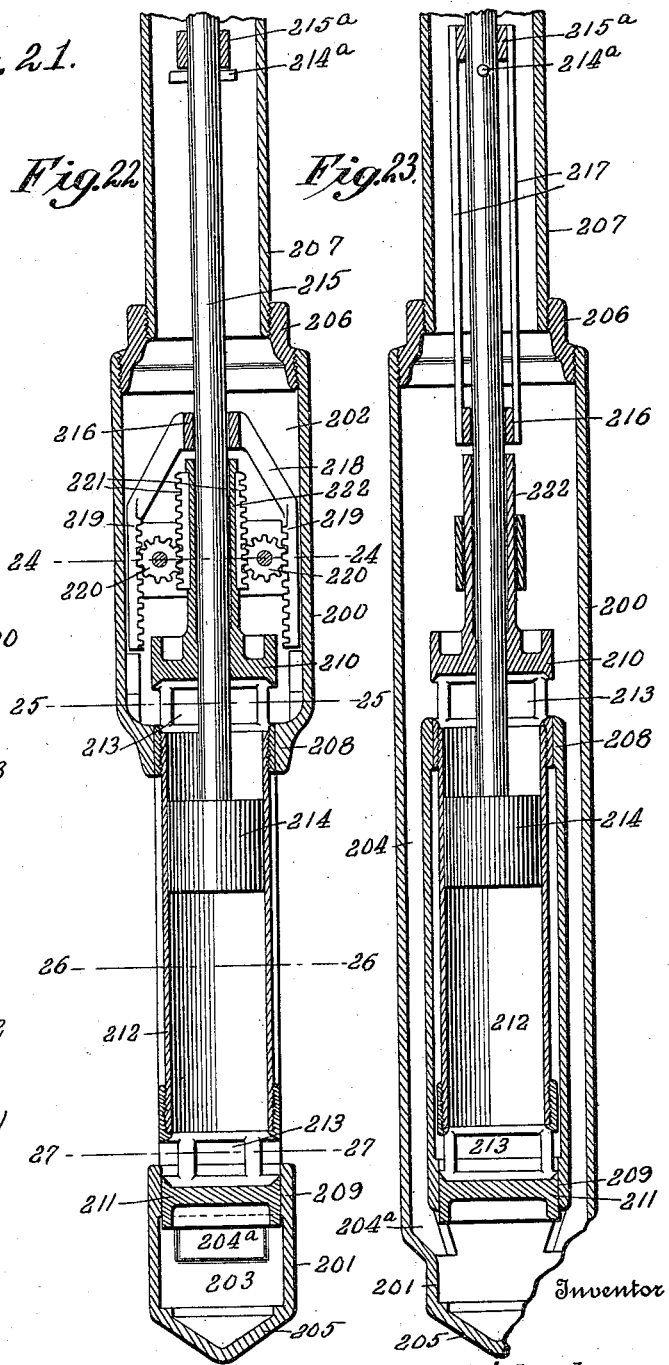

J. M. MICHAELSON.
PUMP.
APPLICATION FILED JULY 11, 1912.

1,175,970.

Patented Mar. 21, 1916.
9 SHEETS—SHEET 8.

Witnesses
Jos. J. Collins
S. V. Caffrey

Inventor
Joseph M. Michaelson
By K. P. McElroy
Attorney

J. M. MICHAELSON.
PUMP.
APPLICATION FILED JULY 11, 1912.

1,175,970.

Patented Mar. 21, 1916.
9 SHEETS—SHEET 9.

Witnesses
Jo. F. Collins
S. V. Caffrey

Inventor
Joseph M. Michaelson
By K. P. McElroy
Attorney

UNITED STATES PATENT OFFICE.

JOSEPH M. MICHAELSON, OF WASHINGTON, DISTRICT OF COLUMBIA.

PUMP.

1,175,970.     Specification of Letters Patent.     Patented Mar. 21, 1916.

Application filed July 11, 1912. Serial No. 708,857.

*To all whom it may concern:*

Be it known that I, JOSEPH M. MICHAELSON, a citizen of the United States, residing at Washington, in the District of Columbia, have invented certain new and useful Improvements in Pumps, of which the following is a specification.

This invention relates to pumps, and more especially to hydraulic pumps; and it comprises a slidably mounted plunger cylinder within which a piston or plunger is arranged to reciprocate and to effect limited longitudinal movement of said plunger cylinder in the direction of piston travel, means for moving said cylinder in a direction opposite to that of the piston travel at a predetermined point or points in the piston stroke, and a pressure or discharge chamber, said cylinder being provided with suitably arranged apertures or ports whereby its interior may be placed in communication at proper intervals with said discharge chamber and with a source of liquid supply; and it relates more particularly to duplex or multiplex double-acting pumps comprising a plurality of plunger cylinders, plungers and means for moving said cylinders, arranged in units as above described, but arranged to discharge liquid into a discharge chamber common to all the units and to draw liquid from a common source; and it also relates to so-called casing pumps adapted for submerged and non-submerged operation, and embodying the same general principles of construction aforesaid; all as more fully hereinafter set forth and as claimed.

In pumps employed to draw water from a source of supply and to expel it under pressure through suitable conduits to a place of use, it has been almost universally customary to employ valves of one kind or another engaging valve seats and held thereon by water or spring pressure, reduction in such pressure or overcoming of the same by superior pressure serving to cause the valves to lift fom their seats and to open at desired intervals for the ingress or egress of water. Valves of this type are well known to be very troublesome in practice, and in spite of many attempts to avoid the difficulties incident to their use, they still remain notably unsatisfactory elements in pump construction.

One object of the present invention is to do away with the necessity for valves of this type; in fact to do away with valves in a pump altogether in the sense in which the term "valve" is ordinarily understood in this connection.

Another object of the invention is to eliminate or to reduce to a negligible minimum the amount of slip or loss in efficiency due to water once pumped reëntering the pumping mechanism and being pumped over again, and to accomplish this reduction of slip without causing the pump to hammer.

Still another object of the present invention is to construct a pump of considerably higher efficiency than has been possible hitherto, by rendering the rate of liquid discharge more nearly uniform throughout the piston stroke in spite of the variations in the speed of piston travel necessarily incident to the use of reciprocating pistons or plungers.

Other objects sought and attained in the present invention will appear more fully hereinafter in connection with the description of typical embodiments of apparatus within the scope of the invention.

In its broader aspects the present pump comprises a plunger cylinder or chamber mounted so as to be capable of limited movement parallel to the line of plunger travel, said cylinder being provided with apertures or ports adapted to serve alternately as inlet or discharge ports according to the position of the movable plunger cylinder, and a suitably actuated piston arranged to reciprocate within the cylinder and to move the same in the direction of piston travel for a limited distance by reason of the pressure of the liquid column imprisoned between the piston and an end of said cylinder. Means are also provided whereby the plunger cylinder may be moved in a direction opposed to that of piston travel at a certain point or points in the stroke to imprison such liquid column, and ordinarily this counter movement of the cylinder should occur near the end of a discharge stroke where the piston speed is relatively small. In this way moreover the amount of water discharged during the last part of the stroke may be materially increased over that usual in reciprocating plunger pumps. In order to secure proper timing, the means for thus moving the cylinder in opposition to the plunger may very conveniently be actuated through suitable connection by the piston-driving means.

Pumps constructed according to the present invention may be arranged to be either single or double acting. The latter type only will however be specifically described herein. Where the pump is to be double acting, the plunger cylinder should be closed at both ends and lateral openings or ports should be provided near each end. Adjacent each end of the cylinder and slidably supporting the same may be for example a housing or the like having stationary ports with which the ports of the movable cylinder register when in their discharge positions and through which liquid is discharged under pressure to a convenient place. Advantageously the ports of these oppositely disposed housings are connected by suitable conduits to form a unitary discharge or pressure chamber. The housings should be so proportioned and arranged that the movable cylinder may be shifted to move its ports out of registry with the ports of the discharge housing and into communication with the liquid supply source to function as inlet ports. If the pump is to operate submerged in the liquid to be pumped, the portions of the movable cylinder intermediate the end housings need not be inclosed, the liquid to be pumped being of course presented directly to the ports of the movable cylinder when the latter is shifted so as to bring the ports at either end outside of the respective housings and into inlet position. If, however, the pump is not to be thus submerged, some kind of inclosing casing or housing must be supplied to form an inlet chamber, such inlet chamber being connected, of course, to the source of liquid supply. In such case, the end and intermediate housings may conveniently be a unitary structure, such as an integral casting, the discharge and inlet portions thereof being isolated from each other as by suitable diaphragms, for example, through which may slide the plunger cylinder.

Two or more plunger cylinders with their contained pistons and cylinder-actuating means may be grouped to form a pump of the duplex or multiplex type. In such a pump, adjacent ends of the cylinders may be housed in a single discharge housing or chamber and the pair of housings may communicate with each other as in a single cylinder pump. Where an intermediate housing is required for an inlet chamber, it may inclose all the cylinders in a single housing thus economizing weight and space and forming an inlet supply chamber common to all the cylinders. This arrangement of parts, to be more fully described hereinafter, is also believed to be novel.

The plunger cylinder may either be integral, or it may advantageously comprise several sections. A convenient arrangement is to provide a middle section consisting of a tube open at both ends within which the piston fits and reciprocates. Suitable caps or thimble-like members serving as cylinder heads and carrying lateral ports are detachably mounted on the ends of this tube to close the same and to present lateral bearing surfaces in sliding engagement with the edges of the diaphragms or other dividing means separating the inlet and discharge chambers. Such an arrangement permits ready repair and replacement of parts worn in use.

In the accompanying drawings I have shown certain typical embodiments of apparatus within the present invention. In this showing, Figure 1 is a side elevation of a complete two-cylinder pump according to the present invention, showing also means for driving the same, parts of the pump being in section on the line 1—1 of Fig. 2; Fig. 2 is a general plan of the same; Fig. 3 is a sectional plan of the twin cylinders and housing; Fig. 4 is an end view of the twin cylinder housing with the heads, plungers, and cylinders removed; Figs. 5, 6, 7 and 8 are enlarged cross sections of the same on the lines 5—5, 6—6, 7—7 and 8—8, respectively, of Fig. 3; Fig. 9 is a vertical longitudinal section on the line 9—9 of Fig. 4, on a larger scale; Fig. 10 is a side elevation of a movable plunger cylinder, partly broken away and in section; Fig. 11 is an end view of Fig. 10 seen from the left; Fig. 12 is a cross section on the line 12—12 of Fig. 10; Fig. 13 is a side elevation of a single cylinder casing pump having an inclosed intake chamber; Fig. 14 is a longitudinal section of the same on the line 14—14 of Fig. 13; Fig. 15 is a similar section at right angles to that of Fig. 14; Figs. 16, 17, 18, 19 and 20 are transverse sections on the lines 16—16, 17—17, 18—18, 19—19 and 20—20, respectively, of Fig. 14; Fig. 21 is a side elevation of a single cylinder pump adapted for submerged operation; Fig. 22 is a longitudinal section of the same on the line 22—22 of Fig. 21; Fig. 23 is a similar section at right angles to that of Fig. 22; Figs. 24, 25, 26 and 27 are transverse sections on lines 24—24, 25—25, 26—26, and 27—27, respectively, of Fig. 22; and Figs. 28 to 33 inclusive show diagrammatically the relative movements of the plunger and movable plunger cylinder through a complete cycle, the cylinder-actuating mechanism of Figs. 1 to 3 being indicated for purposes of illustration.

Referring more particularly to Figs. 1 to 12, the pump designated generally by A, and its accessory driving parts designated generally by B, are supported on suitable foundation members 31 and 32. Plunger cylinders 33 and 34 are similar in all respects and have detachable end caps or thimbles 35, 36, and 37, 38, respectively, forming cylinder heads and bearing members. Each cylinder head may be secured to the intermediate cylinder tube of smaller diameter by screw threads 39, and countersunk set screws 40 may be provided to engage such threads and prevent the heads from turning thereon. Each cap or head is provided with an upper port 41 and a lower port 42. Ports 41 are arranged slightly to one side, and in the assembled pump said ports of each plunger open laterally into the space between the cylinders. Heads (35) and (37) are provided with smooth bores 43 in bosses 44 to permit passage of the piston rod therethrough. Heads (36) and (38) have threaded central bores extending through bosses 45, and these bosses may carry set screws 45$^a$, which may be countersunk as shown, for securing rigid attachment to a threaded operating rod to be hereinafter described more fully. The pump housing, which is best an integral casting of iron, steel, brass or other suitable material and is stationarily mounted on the pump foundation, comprises an outer shell 46 internally divided by longitudinally extending wall or diaphragm 47 having upwardly and laterally curving portions 48, into pressure or discharge chamber 49 and intake or suction chamber 50. As is clearly shown in Figs. 4 to 8, the pressure chamber is thus located in the upper part and centrally of the housing, while the intake chamber is located therebelow and has lateral extensions 51 which are cylindrical in contour and approximately circular in cross section. The middle portion of the intake chamber below the pressure chamber is closed at one end by wall 52, while at the opposite end is threaded inlet opening 53 adapted for connection to piping leading to a well or other source of liquid supply. The lateral cylindrical portions of the intake chamber terminate some distance short of the opposite ends of the housing. Transverse annular diaphragms or webs 54, which are best cast integral with the shell and with the other internal dividing walls of the housing, are provided with openings substantially coaxial with said cylindrical intake extensions and of such dimensions that their edges accommodate the plunger cylinder caps with a close sliding fit and provide bearings therefor. The cylinder caps may be provided with packing of suitable design (not shown) to insure a tight sliding fit with the annular extensions. With the plunger cylinders in place, therefore, terminal chambers or spaces 55 at opposite ends of the housing and beyond the diaphragms (54) are isolated from the intake chamber, but communicate through ports 56 with the pressure or discharge chamber. The dimensions and location of each annular web or diaphragm and of the ports of the cylinder cap sliding thereagainst are such that at one end of the cylinder movement the ports in cap 37, for example, open into the discharge chamber, while the ports in cap 38 open into the inlet chamber. At the other extreme of cylinder movement, the conditions are reversed. The pressure chamber is provided at one end with discharge outlet 57 adapted for connection to pressure main 58 for conveying liquid under pressure to a place of use. At the opposite end, passage 59 leads to air chamber 60 which serves as a buffer and pressure regulator. The arrangement of the discharge outlet and air chamber relative to the other pump parts may of course be varied as desired. The housing may be provided at one end with flanges 61, suitably bored as at 62 to receive bolts 63 for securing the housing to framework 64 carrying a part of the driving mechanism. Similarly, flanges 65 at the other end, bored at 66 receive bolts 67 securing brackets 68 to the housing. At opposite ends of the housing and in line with the plunger cylinders are provided suitable openings closed by closures or heads 69 whose inner faces are recessed, as shown, to receive the caps or heads of the movable plunger cylinders. These housing closures are centrally orificed and are removably secured to the housing as by screw threads 70 or by any other suitable means of attachment, ready access to the interior pump mechanism being thus afforded. Pump rods, piston rods, or plunger rods 71 and 72 carry pistons or plungers 73 and 74, respectively, provided with packing rings 75, and are arranged to reciprocate said pistons within the plunger cylinders. These pistons are of what is commonly termed the solid type; that is, they have no passages connecting their opposite sides. Most conveniently they are built up in the manner clearly illustrated in Fig. 1. The pump rods slide through openings (43) in cylinder caps (35) and (37), and through the corresponding housing closures (69), suitable stuffing box devices, designated generally by 76, being provided to insure tight joints. Rigidly attached to piston rod (71) is cross head 77 traveling in cross head guides 78. Connecting rod 79 pivotally joined to the cross head connects the same with crank pin 80 on crank wheel 81 rigidly carried on shaft 82. On the opposite end of the shaft is keyed gear wheel 83 meshing with spur 84 fixed on shaft 85 to which power is supplied in any suitable way as by an electric motor or a steam engine. Gear wheel (83) carries crank pin 86 to which is secured connecting rod 87 driving a cross head (not shown) attached to pump rod (72) of the other pump unit. The crank pins are best set quartering to avoid having both on dead center at any time, and to insure smoother operation of the pump as a whole.

It is usually desirable to provide spacing means to prevent the inner faces of the plunger cylinder ends from contacting directly with either face of the piston. There is a tendency for this to occur, of course, at the beginning of each plunger stroke, since the positive thrust of the imprisoned water column in front of the advancing face of the piston against the other end of the cylinder tends to shift the cylinder suddenly, at a speed greater than that of the piston, in the direction of piston travel. This tends to bring into abutment the rear face of the piston and the corresponding end of the cylinder. For several reasons it is not desirable that this should occur. Among other things, it would permit the piston to extend across the cap ports and the piston packing rings might snap outwardly and catch on the edges of the ports. Then too it is not desirable to instantly close the ports behind the advancing piston to discharge, but to utilize momentarily the discharge or standpipe pressure thus communicated to the retreating face of the piston or plunger. Any suitable means may be provided for effecting this result. In the present instance I provide internal bosses 88 on cylinder caps (35) and (37) which slidably embrace rods (71). Bosses 89 on caps (36) and (38), together with extensions 90 of the pump rods, act as spacing means at the other end of the cylinder. The described bosses must not extend into the cylinders so far as to interfere with the full stroke of the pistons.

Threaded cylinder-operating rods 91 secured to caps (36) and (38), pass through closures (69) and stuffing boxes 92, and carry spools 93 having flanges 94. Pivoted at 95 on brackets (68) are levers 96 whose upper ends or heads 97 are arranged to engage the flanges of the spools and thereby to move the plunger cylinders in either direction in the desired manner. It is to be noted that the distance between the spool flanges is greater than the width of a lever head, thus permitting the plunger cylinders to move independently of said lever heads within certain limits. Pivoted at 98 to the opposite end of each lever is shifting rod 99 which extends longitudinally of the pump and its driving parts, and is loosely carried in collar bearing 100 suitably secured to the housing of the cross head guides. Trip blocks 101 and 102 are adjustably secured to the shifting rod as by set screws 103 and are arranged to project into the path of travel of the crosshead and to be engaged by the cross head at predetermined points in its stroke. Thus at the proper point in each stroke the cross head strikes one or the other of the trip blocks thereby moving the shifting rod longitudinally to the right or left, as the case may be, and throwing the head of lever (96) in the opposite direction. The lever head engages a flange of the spool and so moves the operating rod and hence the corresponding plunger cylinder a given distance in the same direction.

It is to be understood that other means for driving the rods 99 than that here illustrated may be employed. For example, each shifting rod may be provided with means engaging an eccentric carried on shaft (82) whereby the desired reciprocative motion will be transmitted to the rods. The arrangement shown is, however, convenient and satisfactory.

It is clear from the foregoing that the mechanically produced cylinder movements just described are timed according to the strokes of the plungers or pistons, and that the direction in which each cylinder is thus moved is opposite to the direction of travel of the corresponding piston at that instant. The various elements of the cylinder-actuating mechanism as here illustrated are so proportioned and arranged that the effective throw of the lever head in engaging a spool flange is less than the width of the effective port openings in the plunger cylinders. Thus with the ports in their relative positions indicated in Figs. 1 and 3, with piston (73) traveling toward the right and the ports in cylinder cap (36) full open to discharge, and the ports in cylinder cap (35) open to intake, the cross head will strike trip block 101 near the end of its stroke and the throw of lever head (97) should be such as to move the plunger cylinder to the left until said ports in cap (36) are nearly, but not quite, closed and the ports in cap (35) are completely closed. Complete closure of the ports in (36) with the piston traveling as assumed, would result in water hammer, and would stop or break the pump. Assuming ports 41 to be one inch wide, for example, the plunger may be moved three-fourths of an inch to the left against the advancing piston, leaving an effective port opening in (36) of one-fourth inch at the end of the stroke. This condition is illustrated at the left hand end of cylinder 34 in Fig. 3. Piston 74 has just reached the limit of its stroke toward the left and the cylinder has previously been shifted a distance toward the right sufficient to leave only about one-fourth of the ports in cap (39) open to discharge, and to completely close the ports of cap (38).

The operation of the 2-cylinder pump just described is clear from the foregoing description. The water being supplied from any suitable source to the intake chamber through inlet 53, and assuming the ports to be in position indicated in Figs. 1 and 3 with piston 73 traveling toward the right, water will be drawn from intake chamber 51 into plunger cylinder 33 at the left of the piston through ports 41 and 42 in cylinder cap 35; while water previously taken into the plunger cylinder at the right of the piston or plunger is being forced out through the ports in cap 36 into discharge or pressure chamber 49, and thence through outlet 57 under pressure. A short distance before it reaches the end of its stroke, the crosshead strikes trip block 101, moving the shifting rod to the right and throwing the lever head or knocker 97 to the left. The knocker by its engagement with the spool flange thrusts the plunger cylinder a short distance to the left and of course in a direction opposite to that of plunger travel at that moment. This occurs at a period of the stroke in which the speed of plunger travel is relatively slow and is approaching zero, so that this shifting of the plunger cylinder to the left gives what might be called a double squeeze between the piston and the cylinder head or cap, forcing the remaining water out of the ports in cap 36 and into the discharge chamber at a velocity considerably in excess of the velocity which it would otherwise attain in that portion of the stroke. In other words, the velocity of the water is augmented at the last portion of the stroke. The ports being of ample width, the amount of water thus discharged near the end of the stroke is materially increased over what it would be with a stationary cylinder, and the discharge of the pump is thereby rendered more uniform for all points in the stroke. The ports in cap 36 are however still slightly open to discharge at the end of the stroke, water hammer being thus prevented. The ports in cap 35 have meanwhile been closed by this primary shift.

When the plunger reaches its extreme position toward the right and begins to travel in the reverse direction, the column of water sucked in at the left of the piston on the stroke immediately preceding forms a kind of hydraulic piston between the left face of the plunger and the closed end of cylinder head or cap 35, and its pressure is sufficient to immediately shift the plunger cylinder still further to the left in company with the piston into its extreme position in which the ports of cap 35 now open into discharge port 56 at that end of the housing to permit discharge of water into the discharge chamber. At the same time this secondary shift throws the ports of cap 36 into communication with the inlet chamber 51 from which water is now drawn into the plunger cylinder at the piston, communication between this portion of the plunger cylinder and the discharge chamber having been cut off. As the piston approaches its extreme position at the left, the crosshead strikes trip block 102 whereby the shifting rod is moved toward the left, throwing the knocker toward the right to strike the outer flange of the spool and moving the plunger cylinder toward the right. The closed end of cylinder cap 35 thus moves directly against the piston, diminishing the clearance as before described to expel water into the discharge chamber at what may be termed an artificially heightened velocity. After reaching its extreme position at the left, the piston reverses its direction of travel and the plunger cylinder is given a secondary shift toward the right by reason of the pressure of the water between the piston and the closed end of cylinder cap 36 in a manner entirely similar to that before described. This cycle of operations is repeated for each stroke of the piston to the right and left. The operation of the other pump unit is entirely similar to that just described, the corresponding movements of the parts occurring 90 degrees later for the setting of the cranks here shown.

Describing the pump movements in somewhat different terms and referring particularly to cylinder 33, a slight lap of the housing over the intake ports in cap 35 insures the complete closing of these ports and the incomplete closing of the discharge ports in cap 36 on the preliminary shift of the cylinder toward the left. This imprisons a cylinder full of water at the suction end and leaves partly open to discharge the discharge end at the end of a stroke to prevent hammer. On the return stroke the imprisoned cylinder of water moves with the piston and plunger cylinder, thereby giving the cylinder a secondary shift and bringing the former intake port past the housing to now become a discharge port connecting with the discharge chamber, and bringing the former discharge port past its housing to now become an intake port connecting with the intake chamber. The positive and absolute imprisonment of this cylinder of liquid insures this movement being accomplished without slip.

It is to be noted that ample clearance between the cylinder caps and the housing is provided at each end of the pump, these spaces being in free communication with the discharge chamber. In this way there is always substantially the same pressure acting on both the outer ends of the plunger cylinder: namely, the stand-pipe pressure or, in other words, the pressure against which water is discharged from the plunger cylinder. By thus equalizing the pressure on both ends of the plunger cylinder, a comparatively small force is required to shift the same to cause proper registry of the cylinder ports with the inlet and discharge chambers. It is also to be noted that the clearance before mentioned is somewhat exaggerated below the ends of the cylinders and in the vicinity of ports 42. This is indicated at 104 in Figs. 4, 5 and 8. By providing this clearance, accumulation of dirt, small stones, etc., which may be drawn into the pump is prevented, the sweep of the water forced through these lower ports being sufficient to carry all such material out of the pump itself and into the discharge chamber from which it may be easily removed as occasion required. This arrangement precludes injury of the moving pump parts from such causes.

It is sometimes convenient to provide auxiliary means for starting the pump where self-priming does not readily occur, although ordinarily such auxiliary means may be dispensed with. For example, means may be provided for mechanically reciprocating the cylinders over their complete paths of travel through a sufficient number of strokes to fill the cylinders. Such means may advantageously be connected to the cylinder-operating rods and be driven by the pump-driving means, and should be arranged to be thrown out of gear after the pump is working properly.

The pump shown in Figs. 13 to 20 inclusive embodies substantially the same general principles as the pump hereinbefore described. The particular pump shown in these figures however is what is known as a casing pump and is employed, for example, with drilled wells, and is usually intended to work in a vertical position. The pump parts are surrounded by a housing indicated generally by 150 and is interiorly divided by suitable walls or partitions, which are best cast integral with the housing, into an intake chamber 151 of annular cross section, and pressure chambers 152 and 153 at or near the ends of the casing, said pressure chambers being connected with each other by passages 154, extending along the sides of the housing and opening into the lower discharge chamber through the ports 155. The intake chamber extends downwardly around the lower discharge chamber in separate passages 156 which merge therebelow into pipe 157 threaded for connection to a conduit leading to a supply of water or other liquid to be pumped. The upper pressure chamber may be connected by a threaded coupling 157ª to pipe 158 for conveying the pumped liquid to a place of use.

Within the chambered housing is mounted plunger cylinder 159 provided with removable heads or caps 160 and 161 which have ports 162 and 163 respectively. The plunger cylinder caps bear against the housing and partition walls at 164 and 165 with a close sliding fit whereby the inlet and outlet chambers are properly isolated at all times from each other. Piston or plunger 166 secured to pump rod 167 is actuated by drive means not shown and slides within the plunger cylinder. Packing rings, not shown, may be provided to insure a tight fit. The plunger rod carries a collar 168 which is adjustably secured to the pump rod and is arranged to contact at predetermined points in its stroke with collars 169 and 170 connected to each other by members 171, said collars and members taken together being connected with yoke 172 carrying arms 173 faced with leather or other frictional material and engaging friction pinions or rollers 174 rotatably mounted at 175 in framework 176 removably carried by brackets 177 which may be integral with or detachably secured to the housing or casing. Cylinder cap (160) carries a sleeve 178 loosely embracing the plunger rod and provided with friction faces 179 engaging the fixed pinions before mentioned. A slight clearance is provided, as shown, between cylinder cap 161 and the walls of discharge chamber 153 below bearing 165. This permits water to flow from below the cap and around the same on a down stroke and out through the discharge port.

The operation of the type of pump just described is as follows: The lower end of the pump housing being connected to a source of liquid supply and the parts being in the positions indicated in Figs. 14 and 15 with the plunger moving upward, water is being drawn in from the intake chamber 151 through ports 163 into the plunger cylinder below the plunger. At the same time water is being forced through ports 162 into the pressure chamber above, and out through the casing forming an extension thereof to a place of use. The plunger in the position shown is nearing the end of its upward stroke, and the collar carried by the plunger rod is about to strike collar 169. When this occurs, friction arms 173 are moved upward, and, acting through the friction rollers, move sleeve 178, and hence the cylinder, downwardly as the plunger is completing its upward stroke. As in the case of the horizontal 2-cylinder pump previously described, the extent of this cylinder travel is such as to nearly close ports 162 to the discharge chamber, leaving them open an amount only sufficient to avoid water hammer, while ports 163 are completely closed. Upon reversal of the direction of plunger travel, the water column below the piston pressing against the closed end of cap 161 causes a further shift of the plunger cylinder downward, placing ports 163 in communication with the discharge chamber into which water is forced by the descending plunger, passing thence upwardly by way of the ports 155 and passages 154 to the upper pressure chamber from which it makes its exit through pipe 158. Meanwhile ports 162 have been simultaneously shifted to communicate with the intake chamber, and water enters therefrom filling the space above the descending plunger or piston. Near the end of this stroke, the collar on the pump rod comes into contact with collar 170 causing the friction arms to move downward and thereby, through the friction pinions and the sleeve secured to the plunger cylinder, to shift the plunger cylinder upwardly while the plunger itself is still descending. Upon reversal of the direction of plunger travel the plunger cylinder is shifted still further upward in the manner before described, returning the pump parts to their positions shown in Figs. 14 and 15. It will be seen that the mode of operation is, broadly speaking, entirely similar to that of the duplex pump before described, but the particular details of this casing type of pump make it particularly desirable for certain purposes and in certain connections where the other type of pump is not conveniently employed. In this form also of my improved pump, substantial equality of pressure on both ends of the plunger cylinder is attained, making the power required to shift the cylinder very small. As here illustrated, the end wall of the lower pressure chamber 153 is internal with the side walls. For some purposes however it is desirable to close the lower end of this discharge chamber with a removable cap which may have internal threads engaging threads on the outside of said chamber walls, or which may be otherwise detachably secured thereto. This arrangement permits easy introduction and withdrawal of the pump ports.

A type of pump somewhat similar to the casing pump just described is shown in Figs. 21 to 27 inclusive. In this type of pump no special provision is made for an inlet chamber, the pump being designed to operate when submerged in the liquid to be pumped. End housings 200 and 201 provide discharge or pressure chambers 202 and 203 and are connected to each other by oppositely disposed passages 204, opening into the lower chamber through ports 204$^a$. The lower end of chamber 203 may be closed by a wall 205 cast integral with the casing or housing, as shown, or it may have a detachable cap closure. Chamber 202 may be joined by coupling member 206, or otherwise, to discharge conduit 207. At 208 and 209 are provided bearings in which slide caps 210 and 211, respectively, of plunger cylinder 212. said caps being provided with ports 213. Piston or plunger 214 is attached to pump rod 215 which is driven by suitable means, not shown. The plunger or pump rod is provided with a pin 214$^a$ adjustably arranged to contact at proper points in the plunger stroke with collars 215$^a$ and 216 which are connected together by members 217. This arrangement is entirely similar to that described for the cylinder actuating mechanism in Figs. 14 and 15, and the remaining parts of this cylinder-actuating device, namely, yoke 218 carrying racks 219, fixed pinions 220, and racks 221 carried by sleeve 222 extending upward from cap 210, are positioned and are arranged to operate in substantially the same way. It may be here stated that any of the cylinder actuating means herein described may be used with any of the several types of pumps disclosed, minor alterations of design being necessary of course in some cases. The operation of this submerged type of pump is entirely similar in all essential respects with the casing pump before described. The ports carried by the plunger cylinder are alternately placed in communication with one or the other of the communicating discharge chambers and with the intermediate uninclosed space surrounding the plunger cylinder forming an indefinite intake or suction region. In both these types of casing pump it is again to be noted that the pressure on the opposite ends of the movable cylinder is substantially stand-pipe pressure; and consequently movement of the shifting cylinder is accomplished at relatively small expenditure of energy.

Figure 28:
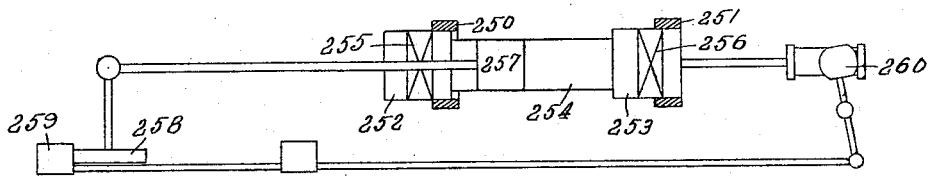
Figure 29:
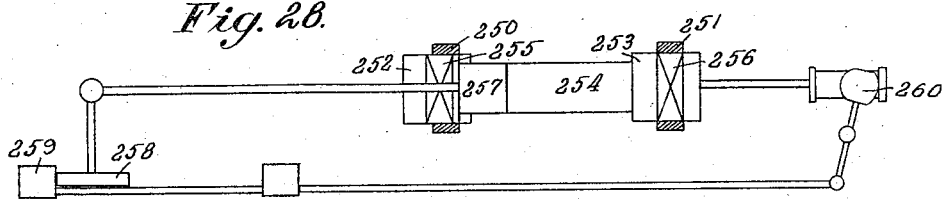
Figure 30:
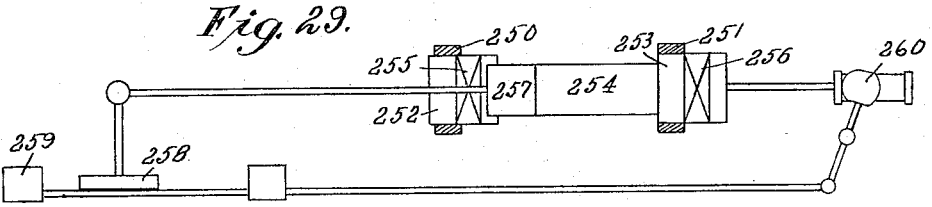
Figure 31:
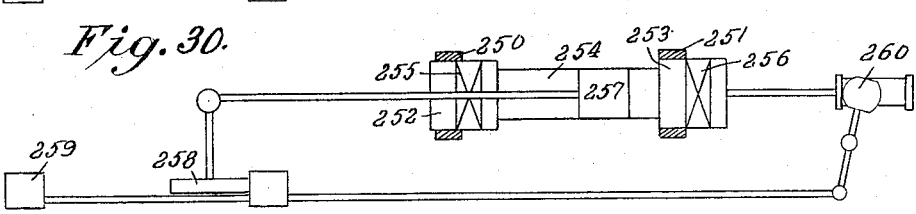
Figure 32:
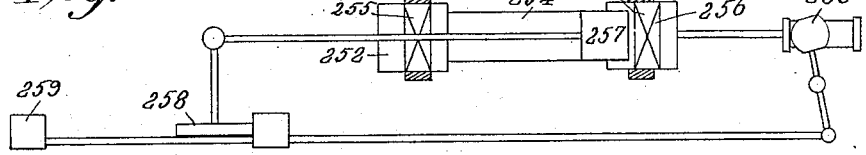
Figure 33:
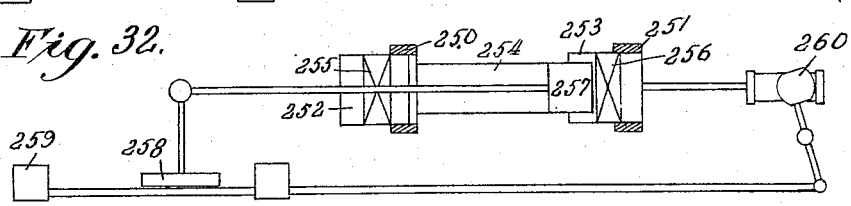

Figs. 28 to 33 inclusive are diagrams whereby the relative positions of the piston and plunger cylinder may be traced through a complete cycle of operations. These diagrams represent the operation of any of the foregoing types of pumps herein described. For purposes of illustration the general type of cylinder-actuating means employed in the 2-cylinder pump are shown conventionally. 250 and 251 are the bearings in which slide cylinder caps 252 and 253 of the plunger cylinder 254. The space between the bearing members represents the intake region, while spaces to the left of 250 and to the right of 251 represent the discharge region. 255 and 256 represent the ports of the cylinder cap. In Fig. 28 piston 257 is moving toward the left and is approaching the end of its stroke while tripper 258 is about to strike trip block 259. Port 255 is wide open to discharge and 256 is open to the intake. In Fig. 29 the piston is shown at the end of its stroke toward the left while the tripper has pushed block 259 to the left, thus throwing knocker 260 to the right whereby the plunger cylinder has also been moved to the right far enough to almost close port 255. Port 256 is entirely closed and is just on the point of opening to discharge. In Fig. 30 the piston has started back toward the right and the pressure of the column of water between the right hand face of the piston and the opposing end of the cylinder has caused the cylinder to slide in the direction of piston travel so as to open port 256 to discharge and 255 to intake. Fig. 31 shows the piston approaching the end of its stroke toward the right and the trip in position where it is about to throw the knocker to the left to move the plunger cylinder in opposition to the advancing piston. This figure is practically the reverse of Fig. 28. Fig. 32 is similar to Fig. 29 but shows conditions reversed. The piston has reached the end of its stroke to the right and the mechanical shifting of the plunger cylinder to the left has occurred, port 256 being nearly closed to discharge while port 255 has been closed to intake and is about to open to discharge. In Fig. 33 the piston is again traveling toward the left and the secondary shift of the plunger cylinder due to the action of the hydraulic piston formed in the cylinder has occurred. This condition continues until the piston has reached the position shown in Fig. 28 and the cycle has been completed.

In the various specific embodiments of my invention hereinbefore described, the bearings in the pump housing or casing on which the cylinder slides are of sufficient width to close the ports both to intake and discharge when the cylinder is in certain positions. The location of the ports is such that when the ports at one end of the cylinder are thus closed, at least a part of the ports at the other end are slightly open to discharge. This condition exists, as before explained, just at the end of a stroke when the plunger is close to the ports left slightly open. With the ports at the other end entirely closed, the conditions for the secondary, or what may be termed the hydraulic, shift of the cylinder on the return stroke of the plunger are of course ideal, since the column of water trapped between the cylinder head and the intake side of the plunger compels the cylinder to shift at once as the plunger reverses its direction of travel. Although this shift immediately opens part way to discharge the closed ports at the other end of the cylinder, and thus to some extent lessens the positive propulsive effect of the trapped water column, this loss is made up by the discharge head now acting on the inside of the cylinder head at its rear. This continues of course until the ports behind the plunger are moved into intake position.

With the arrangement of ports and bearings just described, the ports open their full width to discharge, but do not open completely to intake. This is indicated in the diagrams of Figs. 28 to 33. As a rule this arrangement offers the most advantages, all things considered. It is to be understood, however, that this arrangement may be considerably varied and modified without departing from the spirit of the invention.

A principal object of the invention, whatever may be the specific arrangement of the ports and other details, is to provide a pump having a slidable plunger cylinder which may be primarily shifted over a definite proportion of its possible travel against the advancing plunger, and may then be secondarily shifted the remaining distance on the return stroke of the plunger and in the same direction. While I find it best ordinarily to produce this secondary shift of the cylinder hydraulically, as in the embodiments of my invention here illustrated, I desire not to be limited to accomplishing the secondary shift in this way only. In some instances, positive mechanical control and actuation of the plunger cylinder throughout the entire distance between its limits of reciprocation is desirable. In any case however, an early portion of the cylinder movement in a given direction is opposed to that of plunger travel at that time, while the balance of the cylinder movement in that direction occurs after reversal in the direction of plunger travel.

What I claim is:—

1. A hydraulic pump comprising an intake chamber and a discharge chamber suitably isolated from each other, a movably mounted plunger cylinder with closed ends having limited freedom of movement longitudinally and provided with ports arranged to open into either said intake or said discharge chamber depending upon the position of such movable cylinder relative to said chambers, a plunger or piston arranged to reciprocate within said cylinder, means for driving said plunger, and auxiliary means for moving said cylinder relative to said chambers.

2. A hydraulic pump comprising an intake chamber and a discharge chamber, a slidably mounted plunger cylinder having a closed end and capable of limited movement longitudinally, a port in such slidable cylinder adjacent the closed end thereof and arranged to open into either said intake or said discharge chamber depending upon the position of such slidable cylinder relative to said chambers, a plunger or piston arranged to reciprocate within said cylinder, means for driving said plunger, and auxiliary means for moving said cylinder relative to said chambers.

3. A hydraulic pump comprising a housing inclosing a discharge chamber, a plunger cylinder having a closed end and mounted in such a manner as to be movable relative to said housing, a port in said cylinder adjacent the closed end thereof and arranged to open into or outside of said discharge chamber depending upon the position of said movable cylinder relative to said chamber, a plunger arranged to reciprocate within said cylinder, means for driving said plunger, and auxiliary means for moving said cylinder relative to said chambers.

4. A hydraulic pump comprising an intake chamber, a discharge chamber, a movable cylinder having a head at each end and provided with a lateral port adjacent each head, each port being arranged to open into said intake chamber while the other port opens into said discharge chamber and vice versa, a suitably actuated plunger arranged to reciprocate within said cylinder, and means for shifting said cylinder in a direction opposite to that of plunger travel during a stroke.

5. A pump comprising a pair of oppositely disposed walled chambers, a cylinder arranged between said chambers and slidably mounted near its opposite ends in closely fitting alined openings in the walls of said chambers, said cylinder being capable of longitudinal reciprocation within definite limits, a lateral port located near each end of said cylinder and arranged to open into the chamber adjacent that end of the cylinder, or to open into the region between the chambers, depending upon the position of the slidable cylinder relative to the chambers, a plunger fitting closely within said cylinder and arranged to reciprocate therein, means for actuating said plunger, and means for mechanically moving said cylinder through a part only of the total distance between its limits of reciprocation.

6. A pump comprising a pair of oppositely disposed walled chambers, a cylinder arranged between said chambers and slidably mounted near its opposite ends in closely fitting alined openings in the walls of said chambers, said cylinder being capable of longitudinal reciprocation within definite limits, a lateral port located near each end of said cylinder and arranged to open into the chamber adjacent that end of the cylinder, or to open into the region between the chambers, depending upon the position of the slidable cylinder relative to the chambers, a plunger fitting closely within said cylinder and arranged to reciprocate therein, means for actuating said plunger, and means for mechanically moving said cylinder through a part only of the total distance between its limits of reciprocation, said means being arranged to operate when the plunger is nearing the end of a stroke.

7. A pump comprising a pair of oppositely disposed walled chambers, a cylinder arranged between said chambers and slidably mounted near its opposite ends in closely fitting alined openings in the walls of said chambers, said cylinder being capable of longitudinal reciprocation within definite limits, a lateral port located near each end of said cylinder and arranged to open into the chamber adjacent that end of the cylinder, or to open into the region between the chambers, depending upon the position of the slidable cylinder relative to the chambers, a plunger fitting closely within said cylinder and arranged to reciprocate therein, means for actuating said plunger, and means for mechanically moving said cylinder through a part only of the total distance between its limits of reciprocation, said means being arranged to operate when the plunger is nearing the end of a stroke and to shift the cylinder in a direction opposite to that of plunger travel at that time.

8. A hydraulic pump comprising a pair of oppositely disposed walled chambers, a suitable passage connecting the same, said chambers and connecting passage forming a pressure or discharge region, and the space between said chambers being an intake region, a pair of alined openings, one in a wall of each said chamber, a reciprocable plunger cylinder with closed ends slidably carried and closely engaged by the edges of said alined openings, ports in said cylinder arranged to open into said discharge region and said intake region as the cylinder reciprocates, a plunger arranged to reciprocate within said cylinder, means for reciprocating said plunger, and means for moving said cylinder in a direction opposed to that of plunger travel at a predetermined point in the plunger stroke.

9. A hydraulic pump comprising a walled discharge chamber a plunger cylinder provided with a head and arranged for reciprocation through the wall of said discharge chamber, a port located near the head of said cylinder and arranged to be presented alternately to the interior and the exterior of said chamber by the reciprocation of said cylinder, a piston or plunger arranged to reciprocate within said cylinder and provided with driving means, and means operating at each stroke of the plunger toward the head of the cylinder to move the cylinder relative to said discharge chamber.

10. A hydraulic pump comprising a walled discharge chamber, a plunger cylinder provided with a head and arranged for reciprocation through the wall of said discharge chamber, a port located near the head of said cylinder and arranged to be presented alternately to the interior and the exterior of said chamber by the reciprocation of said cylinder, a piston or plunger arranged to reciprocate within said cylinder and provided with driving means, and means operating during the latter part of each stroke of the plunger toward the head of the cylinder to move the cylinder relative to said discharge chamber.

11. A hydraulic pump comprising a walled discharge chamber, a plunger cylinder provided with a head and arranged for reciprocation through the wall of said discharge chamber, a port located near the head of said cylinder and arranged to be presented alternately to the interior and the exterior of said chamber by the reciprocation of said cylinder, a piston or plunger arranged to reciprocate within said cylinder and provided with driving means, and means operating during the later part of each stroke of the plunger toward the head of the cylinder to move the cylinder in a direction opposed to that of plunger travel.

12. A hydraulic pump comprising a discharge chamber, a cylinder provided with a head at each end and having a lateral port adjacent each head, bearings supporting said cylinder and permitting longitudinal reciprocation thereof whereby the ports adjacent each head may be alternately moved into and out of said discharge chamber, a plunger arranged to reciprocate within said cylinder, means for driving said plunger, and means for shifting said cylinder in opposition to said plunger.

13. A hydraulic pump comprising a walled discharge chamber having a pair of lateral extensions, a movable cylinder extending between said extensions and provided with a head at each end and having a port adjacent each head, an aperture in the wall of each said lateral extension, said apertures being in alinement and the edges thereof engaging the sides of said cylinder with a close sliding fit, and said cylinder being movable longitudinally to present the port adjacent each head on either side of the apertured wall of the corresponding lateral extension, a plunger arranged to reciprocate within said cylinder, means for driving said plunger and means for moving said cylinder in opposition to the plunger near the end of each plunger stroke.

14. A pump comprising a pair of communicating discharge chambers, a longitudinally reciprocable cylinder provided with suitable heads extending therebetween and projecting thereinto, a lateral port or ports near each end of said cylinder arranged to open into or outside of the corresponding discharge chamber depending upon the position of the cylinder, a plunger arranged to reciprocate within said cylinder, means for reciprocating said plunger, and means operating near the end of each stroke of the plunger to move the cylinder in the opposite direction a sufficient distance to partly close the port or ports near that end of the cylinder to discharge.

15. A pump comprising a pair of communicating discharge chambers, a longitudinally reciprocable cylinder provided with suitable heads extending therebetween and projecting thereinto, a lateral port or ports near each end of said cylinder arranged to open into or outside of the corresponding discharge chamber depending upon the position of the cylinder, a plunger arranged to reciprocate within said cylinder, means for reciprocating said plunger, and means operating near the end of each stroke of the plunger to move the cylinder in the opposite direction a sufficient distance to partly close the port or ports near that end of the cylinder to discharge, while the port or ports near the other end are about to open to discharge.

16. A pump comprising a pair of communicating discharge chambers, a longitudinally reciprocable cylinder provided with suitable heads extending therebetween and projecting thereinto, an intake chamber adjacent said cylinder, a lateral port or ports near each end of said cylinder arranged to open into the corresponding discharge chamber or into said intake chamber depending upon the position of the cylinder, a plunger arranged to reciprocate within said cylinder, means for reciprocating said plunger, and means operating near the end of each stroke of the plunger to move the cylinder in the opposite direction a sufficient distance to partly close the port or ports near that end of the cylinder to discharge, and to completely close the port or ports near the other end to intake.

17. A pump comprising a pair of communicating discharge chambers, an intake chamber located therebetween, a longitudinally reciprocable cylinder extending through said intake chamber and projecting into said discharge chambers, a lateral port or ports near each end of said cylinder arranged to open into the corresponding discharge chamber or into said intake chamber depending upon the position of the cylinder, a plunger arranged to reciprocate within said cylinder, means for reciprocating said plunger, and means operating near the end of each stroke of the plunger to move the cylinder in the opposite direction a sufficient distance to partly close the port or ports near that end of the cylinder to discharge and to completely close the port or ports near the other end to intake.

18. A pump comprising a housing interiorly divided by walls integral therewith into an intake chamber, and a discharge chamber parallel thereto, said discharge chamber having lateral extensions located at opposite ends of said intake chamber, a slidably mounted cylinder extending through said intake chamber and projecting into said lateral extensions of the discharge chamber, a port or ports adjacent each end of the cylinder and arranged to open into or outside of the corresponding discharge chamber depending upon the position of the cylinder, a plunger arranged to reciprocate within said cylinder, means for reciprocating said plunger, and means operating near the end of each stroke of the plunger to move the cylinder in the opposite direction a sufficient distance to partly close the port or ports near that end of the cylinder to discharge.

19. A hydraulic pump comprising a pair of communicating discharge chambers, a longitudinally reciprocable cylinder provided with suitable heads extending therebetween and projecting thereinto, a lateral port or ports near each end of said cylinder arranged to open into or outside of the corresponding discharge chamber depending upon the position of the cylinder, a plunger arranged to reciprocate within said cylinder, a pump rod secured to said plunger and slidable through an aperture in one of the cylinder heads, means for driving said rod, a member secured to said cylinder for moving the same, and mechanism actuated by the rod-driving means for operating said member periodically.

20. A hydraulic pump comprising a pair of communicating discharge chambers, a longitudinally reciprocable cylinder provided with suitable heads extending therebetween and projecting thereinto, a lateral port or ports near each end of said cylinder arranged to open into or outside of the corresponding discharge chamber depending upon the position of the cylinder, a plunger arranged to reciprocate within said cylinder, means for reciprocating said plunger, and means controlled by the plunger-reciprocating means and operative near the end of the plunger stroke for moving the cylinder in opposition to said plunger.

21. A hydraulic pump comprising an intake chamber and a discharge chamber, a plurality of cylinders reciprocably mounted adjacent said chambers and each having ports arranged to be placed in communication with said intake and said discharge chamber alternately by the reciprocation of the cylinders, a suitably driven plunger arranged to reciprocate within each cylinder, and means for shifting each cylinder at a predetermined point in the stroke of its plunger in a direction opposed to that of plunger travel to augment the velocity of the fluid being pumped.

22. A pump comprising an elongated centrally disposed intake chamber having a plurality of lateral extensions of approximately similar length, a discharge chamber adjacent said intake chamber and connected to pressure chambers arranged one at each end of said intake extensions, a plurality of cylinders, each extending through an intake extension and projecting into the corresponding pressure chambers at the ends thereof, said cylinders being mounted for reciprocation and having ports near each end arranged to open to intake or discharge as the cylinders reciprocate, suitably driven plungers arranged for sliding reciprocation within said cylinders, and means for moving each cylinder prior to the end of each stroke of its plunger in opposition to said plunger, whereby the cylinder ports on the discharge side of said piston are nearly closed to discharge while the ports on the opposite side thereof are closed to intake.

23. A hydraulic pump comprising two cylindrical intake chambers opening into a passage arranged therebetween, a discharge chamber adjacent said passage and connected with inclosed terminal pressure spaces arranged at the opposite ends of the cylindrical intake chambers, a movable cylinder extending through each intake chamber and projecting into said terminal pressure spaces, said cylinders being mounted for reciprocation and having ports near each end arranged to open to intake or discharge as the cylinders reciprocate, suitably driven plungers arranged for sliding reciprocation within said cylinders, and means for moving each cylinder prior to the end of each stroke of its plunger in opposition to said plunger to augment the velocity of the fluid being pumped.

24. In a pump, a cylinder mounted for limited longitudinal reciprocation and having ports adapted to function alternately as inlet or discharge ports, a plunger arranged to reciprocate within said cylinder and means operative to move said cylinder over less than the whole distance between its limits of reciprocation.

25. In a hydraulic pump, a cylinder mounted for limited longitudinal reciprocation and having ports adapted to function alternately as inlet or discharge ports, a plunger arranged to reciprocate within said cylinder and means operative to move said cylinder in a direction opposed to that of plunger travel at a given time to augment the velocity of the fluid being pumped.

26. In a pump, a cylinder having suitable heads and provided with lateral port openings, a mounting for said cylinder permitting longitudinal movement of said cylinder for a limited distance, a suitably driven plunger arranged to reciprocate within said cylinder, and means for mechanically shifting said cylinder over a part of said distance in a direction opposed to that of plunger travel as said plunger approaches an end of its stroke, said cylinder being arranged to be hydraulically shifted the remainder of said distance, after the plunger reverses its direction of travel, by the pressure of liquid trapped between the piston and the head at the opposite end of the cylinder.

27. In a pump, a plunger cylinder mounted for reciprocation and provided with apertures adapted to function as intake and discharge ports, a plunger arranged to reciprocate within said cylinder, means for actuating said plunger and means for moving said cylinder, such cylinder-moving means being arranged to move said cylinder through a part of its travel in opposition to the plunger, while the balance of such travel occurs in the direction of plunger travel.

28. In a pump, a cylinder mounted for limited longitudinal reciprocation and provided with ports adapted to function alternately as inlet or discharge ports, a plunger arranged to reciprocate within said cylinder, and intermittently operating means for moving said cylinder in a direction opposed to that of plunger travel to augment the velocity of the fluid being pumped.

In testimony whereof, I affix my signature in the presence of two subscribing witnesses.

JOSEPH M. MICHAELSON.

Witnesses:
JOHN H. SIGGERS,
R. F. STEWARD.

Copies of this patent may be obtained for five cents each, by addressing the "Commissioner of Patents, Washington, D. C."